(12) United States Patent
Hall et al.

(10) Patent No.: US 9,663,281 B2
(45) Date of Patent: May 30, 2017

(54) SLURRY PRODUCT FILLED FILM POUCHES AND METHOD OF MAKING SAME

(71) Applicant: The Pictsweet Company, Bells, TN (US)

(72) Inventors: Alex Hall, Bells, TN (US); Eldridge Mount, Canandaigua, NY (US)

(73) Assignee: THE PICTSWEET COMPANY, Bells, TN (US)

( * ) Notice: Subject to any disclaimer, the term of this patent is extended or adjusted under 35 U.S.C. 154(b) by 264 days.

(21) Appl. No.: 14/389,190

(22) PCT Filed: Jul. 8, 2014

(86) PCT No.: PCT/US2014/045757
§ 371 (c)(1),
(2) Date: Sep. 29, 2014

(87) PCT Pub. No.: WO2015/006328
PCT Pub. Date: Jan. 15, 2015

(65) Prior Publication Data
US 2016/0257467 A1 Sep. 8, 2016

Related U.S. Application Data

(60) Provisional application No. 61/843,651, filed on Jul. 8, 2013.

(51) Int. Cl.
*B65D 65/38* (2006.01)
*B32B 27/32* (2006.01)
(Continued)

(52) U.S. Cl.
CPC .......... *B65D 65/38* (2013.01); *B29C 47/0021* (2013.01); *B29C 47/0026* (2013.01); *B29C 47/0066* (2013.01); *B29C 47/061* (2013.01); *B29C 47/065* (2013.01); *B29D 22/003* (2013.01); *B32B 7/02* (2013.01); *B32B 7/12* (2013.01); *B32B 27/08* (2013.01); *B32B 27/30* (2013.01); *B32B 27/306* (2013.01); *B32B 27/32* (2013.01); *B32B 27/325* (2013.01); *B32B 27/327* (2013.01); *B32B 27/34* (2013.01); *B32B 27/36* (2013.01); *B32B 27/365* (2013.01); *B32B 27/40* (2013.01); *B32B 33/00* (2013.01);
(Continued)

(58) Field of Classification Search
CPC .. B65D 65/38; B32B 7/02; B32B 7/12; B32B 27/08; B32B 27/32; B32B 27/40; B32B 2270/00; B32B 2553/00; B65B 7/02; B65B 51/225; B65B 9/20
IPC ....................................................... B65D 65/38
See application file for complete search history.

(56) References Cited

U.S. PATENT DOCUMENTS 4,019,547 A 4/1977 Ross
6,957,915 B2 10/2005 Tankersley
(Continued)

FOREIGN PATENT DOCUMENTS

CN 101525071 9/2009

*Primary Examiner* — Michael C Miggins
(74) *Attorney, Agent, or Firm* — Cooper & Dunham LLP

(57) ABSTRACT

Multiple layer coextruded films of high melting temperature polymers and polyethylene permit the effective ultrasonic sealing of wet, contaminated sealing surfaces to produce water tight, leak free packages for wet product. The slurry filled packages may be used and stored at room temperatures, or may be advantageously frozen for long term storage and transport while frozen.

20 Claims, 4 Drawing Sheets

| Layer 1 | | Low melting Sealant |
| --- | --- | --- |
| Layer 2 | | Bulk low melting PE layer |
| Layer 3 | | Low melting Sealant |

(51) Int. Cl.

| | | |
|---|---|---|
| *B32B 33/00* | (2006.01) |
| *B29D 22/00* | (2006.01) |
| *B32B 27/34* | (2006.01) |
| *B29C 47/00* | (2006.01) |
| *B29C 47/06* | (2006.01) |
| *B32B 7/02* | (2006.01) |
| *B32B 7/12* | (2006.01) |
| *B32B 27/08* | (2006.01) |
| *B32B 27/30* | (2006.01) |
| *B32B 27/36* | (2006.01) |
| *B32B 27/40* | (2006.01) |
| *B65B 7/02* | (2006.01) |
| *B65B 9/20* | (2012.01) |
| *B65B 51/22* | (2006.01) |
| *B32B 37/15* | (2006.01) |

(52) U.S. Cl.
CPC ............... *B65B 7/02* (2013.01); *B65B 9/20* (2013.01); *B65B 51/225* (2013.01); *B32B 37/153* (2013.01); *B32B 2250/04* (2013.01); *B32B 2250/05* (2013.01); *B32B 2270/00* (2013.01); *B32B 2307/306* (2013.01); *B32B 2307/702* (2013.01); *B32B 2439/40* (2013.01); *B32B 2553/00* (2013.01)

(56) References Cited

U.S. PATENT DOCUMENTS

| | | |
|---|---|---|
| 7,065,937 B2 | 6/2006 | Tankersley |
| 2004/0038012 A1 | 2/2004 | Cook |
| 2006/0051464 A1 | 3/2006 | McHugh |
| 2008/0113130 A1 | 5/2008 | Schell |
| 2009/0252981 A1 | 10/2009 | Chambliss |
| 2012/0009370 A1 | 1/2012 | Schaefer |
| 2012/0312711 A1 | 12/2012 | Davies |

| Layer 1 | | Low melting Sealant |
| Layer 2 | | Bulk low melting PE layer |
| Layer 3 | | Low melting Sealant |

| Layer 1 | | Low melting Sealant |
| Layer 2 | | Tie layer |
| Layer 3 | | High temperature polymer layer |
| Layer 4 | | PE / EVA blend |
| Layer 5 | | High temperature polymer layer |
| Layer 6 | | Tie layer |
| Layer 7 | | Low melting Sealant |

| Layer 1 | | Low melting Sealant |
| Layer 2 | | Tie layer or PE/EVA blend |
| Layer 3 | | High temperature polymer layer |
| Layer 4 | | Tie layer |
| Layer 5 | | Bulk PE layer |
| Layer 6 | | Tie layer |
| Layer 7 | | High temperature polymer layer |
| Layer 8 | | Tie layer or PE/EVA blend |
| Layer 9 | | Low melting Sealant |

| Variable | Product Spec Code | Description | Gauge |
|---|---|---|---|
| Control | | 3-layer non-homogenous PE (white) | 3.88 |
| A2-WNH | 2000-1-10.00 | 3-layer non-homogenous PE (white) | 2 |
| A3-WNH | 2000-1-10.00 | 3-layer non-homogenous PE (white) | 3 |
| A4-WNH | 2000-1-10.00 | 3-layer non-homogenous PE (white) | 4 |
| A2-CNH | 2000-0-0.00 | 3-layer non-homogenous PE (clear) | 2 |
| A3-CNH | 2000-0-0.00 | 3-layer non-homogenous PE (clear) | 3 |
| A4-CNH | 2000-0-0.00 | 3-layer non-homogenous PE (clear) | 4 |
| B2-H-LMI | 4063-0-0.00 | 3-layer homogenous low melt index PE | 2 |
| B3-H-LMI | 4063-0-0.00 | 3-layer homogenous low melt index PE | 3 |
| B4-H-LMI | 4063-0-0.00 | 3-layer homogenous low melt index PE | 4 |
| C2-H-HMI | 2043-0-0.00 | 3-layer homogenous high melt index PE | 2 |
| C3-H-HMI | 2043-0-0.00 | 3-layer homogenous high melt index PE | 3 |
| C4-H-HMI | 2043-0-0.00 | 3-layer homogenous high melt index PE | 4 |
| D2.5-CPP | Flexi 7181 | 2-layer Laminate PET/CPP | 2.5 |

FIG. 7

SLURRY PRODUCT FILLED FILM POUCHES AND METHOD OF MAKING SAME

CROSS-REFERENCE TO RELATED APPLICATIONS

This application is a §371 of PCT/US2014/45757, filed Jul. 8, 2014, claiming priority of U.S. Application No. 61/843,651, filed Jul. 8, 2013.

FIELD OF THE INVENTION

This invention relates primarily to the bulk packaging of vegetable slurries, with multilayer polymer packaging films using automated packaging machines and methods. The multilayer coextruded films of the invention contain high temperature resistant layer(s) and low melting temperature sealing layers and are sealed together to produce product filled bags of uniform weight. The product filled bags are produced by ultrasonic sealing the multilayer films on high speed Vertical Form Fill and Seal [VFF&S] machines. The VFF&S machines are modified to fill the forming packages with high solid vegetable slurries for frozen storage. Specifically, the bags are formed from films capable of forming ultrasonic seals without pinholes and sealing of surfaces contaminated with vegetable solids.

BACKGROUND OF THE INVENTION

Bulk packaging of leafy, stringy and other low bulk density vegetables with a uniform package product weight is a difficult and time consuming process. Historically, such vegetables after blanching have been packaged by hand into cans. Hand filling of cans requires the operator to fill, weigh and then add or remove product to obtain product weights within the weight tolerance range set for the product. This is a slow and operator intensive process and is generally limited to no more than 5 cans per minute per operator.

Alternatives to hand packing leafy vegetables using complex mechanical devices such as described in U.S. Pat. No. 4,019,547 have been developed but they are used to fill metal cans which are disappearing from commerce due to their weight and expense. There is a strong desire among producers and consumers to replace the heavy cans with light weight polymer films.

Wax cartons with wax overwrap also have been used for packaging vegetables such as spinach in 10 ounce packages. Those packages also are labor-intensive and costly.

Leafy vegetables such as spinach and lettuce have been packaged fresh into polymer bags, but are limited in the weight of each bag, the shelf life of the packaged product and the special film and atmosphere requirements of respiring vegetables. While this may be acceptable for individual consumers for the preparation of fresh salads, it does not meet the needs of institutional kitchens or large volume suppliers for bulk packaging of leafy vegetables for cooking or reheating and serving.

Therefore, it has been a goal to develop a packaging film and packaging method for the packaging of high solid vegetable slurries for frozen storage, transport and institutional use to replace cans and wax cartons. Replacing cans and wax cartons for vegetables will reduce the transportation weight of the vegetables, and permit the frozen storage of the vegetables which will prove the nutritional quality and taste of the final cooked vegetable product. The use of high solids slurries will improve the product packaged density and improve the uniformity of the filling process. However, the packaging of high solids slurries produces sealing surfaces which are potentially contaminated with solid vegetable. This solid contamination has been found to inhibit the sealing of the bags with traditional heat sealing methods usually employed on VFF&S packaging machines.

It has been discovered that ultrasonic sealing methods can seal through dry solid contamination, using traditional polyolefin packaging films. However, when the solids are combined with water into slurries, the water captured with the solids in the ultrasonic sealing area produce holes in the seal areas which lead to product leakage and package failure. This wet product sealing difficulty can be overcome using laminations, such as produced with oriented PET films combined with coextruded or single layer polyethylene sealants. Without being limited by a particular theory, it is believed that during ultrasonic sealing of the wet sealing surfaces, that as the polyethylene film of the bag wall melts from the action of the ultrasonic energy, the water on the film surface and/or contained in the vegetable slurry is converted to water vapor or steam by the ultrasonic energy and the steam released during sealing perforates the molten polyethylene film layers creating pin holes, voids, weak seal areas and leaks in the seal area, all of which render the seal unusable for the application. The high temperature layer of PET in the lamination is believed to support the molten polyethylene sealing layer from being sufficiently distorted as to form pin holes, voids and leaks in the seal area.

Even though the laminations can be successfully sealed to form packages of high solids content vegetable slurries, they are considerably more expensive than coextruded packaging films and due to the considerably poorer low temperature ductility of the PET film, suffer significant package breakage in cold storage and transport.

While the use of higher melting polypropylene to replace lower melting polyethylene core layers in multilayer coextrusions would be sufficient to reduce or eliminate the steam perforation of the seal area, polypropylene homopolymer layers have poor low temperature ductility at freezer temperatures and are known to give considerable package breakage in cold storage and transport. Copolymer and terpolymer polypropylene layers will reduce the melting point sufficiently to give layer perforation without a significant improvement in cold storage performance. Consequently, the use of polypropylene or copolymer and terpolymer propylene layers in the current film structures has not proven adequate when the product is to be frozen for storage and transport.

All prior known techniques are either too expensive for long term economic performance or limit the cold storage and shipping of the frozen vegetable products.

SUMMARY OF THE INVENTION

It is the object of the invention to supply a coextruded film and an ultrasonic sealing method for the bulk packaging of high solid vegetable slurries on high speed VFF&S packaging machines.

It is another object of the invention to make use of a multilayer coextruded film to replace the use of more expensive PET/polyethylene laminations in the bulk packaging of high solid vegetable slurries for use with ultrasonic sealing methods on high speed VFF&S packaging machines.

It is another object of the invention to make use of multilayer coextrusions containing one or more high temperature polymer layers to permit the ultrasonic sealing of wet, contaminated sealing surfaces without the complete melting, void formation, perforation, product leakage and failure of the sealing area.

It is another object of the invention to supply a method for the high speed formation and filling of a flexible film container for the packaging, frozen storage and transportation of frozen high solids vegetable slurries.

The present invention makes use of multilayer coextrusions comprising surface layers of low melting polymers, such as polyethylene sealant resins, combined with interior layer combinations of polyethylene and high melting temperature polymers such as Nylon 6, Nylon 66, Nylon 6/Nylon 66 blends, amorphous nylons, polyesters, cyclic olefinic copolymers (COCA copolymers of ethylene and vinyl alcohol (EVOH), polypropylene and other polymers with softening or melting points above about 145° C.

While single layers of the high temperature polymers may be sufficient to permit the high speed ultrasonic sealing of wet contaminated sealing areas, it has been discovered that the use of multiple layers of high temperature polymers, to capture internal layers of polyethylene or other low melting polymers, will be especially beneficial in package sealing and forming liquid tight seals of the wet, vegetable slurry contaminated sealing surfaces without film perforation in the sealing area. In addition, using multiple layers of high temperature resins are known to improve the ductility of the polymer layers. Using multiple layers of less ductile polymers will also prevent a crack in one layer from tearing the remaining polyolefin layers, as has been observed in three layer films and laminations, and improve the ductility of the multilayer coextrusion during cold storage and transportation.

The combination of one or more high melting polymer layers with polymer layers such as the polyethylenes with excellent low temperature durability, and additional low melting sealing layers will produce a film and package with the ultrasonic sealing properties required for the sealing of wet, vegetable contaminated surfaces on high speed VFF&S packaging machines, while maintaining the multilayer films low temperature durability necessary for the freezing, frozen storage and frozen transport of the package.

For the purposes of this disclosure, the terms;
"low melting temperature polymer" is a polymer which when sealed with an ultrasonic sealer will melt and form a heat seal, but which when ultrasonically heated with wet and contaminated seal areas the seal areas will be formed with defects such as voids, pin holes and be prone to product leakage and package failure.

"high melting temperature polymer" is a polymer which melts or softens at a temperature sufficiently high enough that during the ultrasonic heating of wet and contaminated sealing areas the high temperature polymer layer will not be formed with defects such as voids, pin holes and be prone to product leakage and package failure.

DESCRIPTION OF THE DRAWINGS

FIG. 7: Comparative films for testing.

DETAILED DESCRIPTION OF THE INVENTION

The incorporation of a single or multiple layer of a high melting polymer by coextrusion into a polyethylene or other polyolefin based film will permit the effective ultrasonic sealing of wet, contaminated sealing surfaces to produce water tight, leak free packages for wet product. The product filled packages may be used and stored at room temperatures, or may be advantageously frozen for long term storage and transport while frozen.

Figures 1, 2:
FIG. 1: Coextruded three layer film of the prior art.
FIG. 2: Picture of typical wet, contaminated seal failure of polyolefin coextrusions observed when ultrasonically sealed.

The use of traditional heat sealing techniques has been insufficient for effectively sealing the wet and contaminated film sealing surfaces. FIGS. 1 and 2 illustrate these deficiencies. Moreover, the ultrasonic sealing of contaminated surfaces of films without the coextruded high melting polymers leads to poor seal integrity, package leaks and seal failure during frozen storage and transport.

Figures 3, 4:
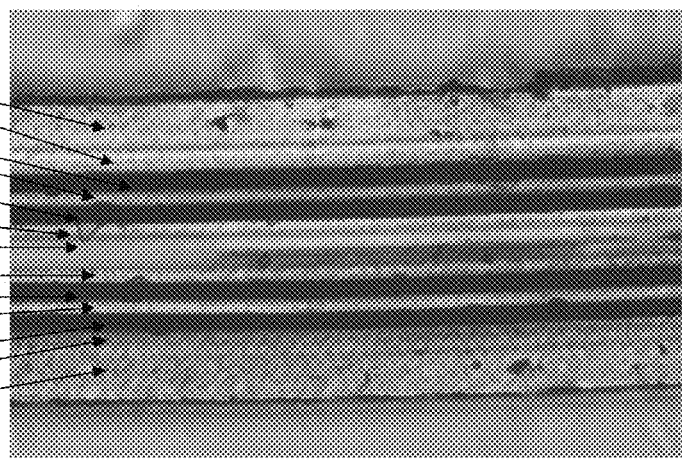
FIG. 3: Coextruded 13 layer film for ultrasonic sealing of high solids vegetable slurries.
FIG. 4: Coextruded seven layer film for ultrasonic sealing of high solids vegetable slurries.

There are several film constructions which are suitable for use in accordance with the invention. FIG. 3 shows a 13 layer multilayer coextruded film in accordance with the invention. The polyethylene outer layers of the film supply a fusible surface when activated or melted by ultrasonic energy, The multiple nylon layers supply sufficient hot strength to prevent the film from being perforated by steam generated from water or wet product in the seal area by the ultrasonic energy. Nylon does not seal to itself so an outside PE layer is necessary. The multilayer bag has shown excellent durability and integrity when frozen and transported.

Without being bound by any theory, it is believed that the use of two or more nylon layers will sufficiently improve the sealing integrity and water tightness of the seal by capturing interior layers of low melting polymer which will melt during ultrasonic sealing. Capturing the molten layer between the high melting polymer layers will prevent steam perforation of the molten core layer while allowing better sealing of the bag corners and lap or fin seal areas due to the improved conformability, or compliance of the captured molten layers.

Additionally, the low temperature ductility of the high melting temperature layers will be improved by making them thinner and supporting them with the low melting polymers which show excellent low temperature ductility. This layer support and subsequent improved ductility of the high melting temperature polymers by the low melting temperature polymers will prevent bag failure during cold storage and transport.

FIG. 3 displays a cross section and polymer description of a 13 layer film used in the invention. The 13 layer film is comprised of three polymer layers; a low melting temperature polymer in layers 1, 7 and 13, a high melting temperature polymer in layers 3, 5, 9 and 11 and adhesive, or "tie," polymer in layers 2, 4, 6, 8, 10 and 12.

Other films also may be useful in the invention, as described below.

The film disclosed in FIG. 3 is not suitable by itself for forming a leak free pouch filled with water and spinach slurry with traditional heat scaling equipment. The spinach slurry will contaminate the seal area. However, it has been discovered that the film of FIG. 3 will successfully form a sealed pouch filled with water and spinach slurry and other leafy greens when ultrasonically sealed. The ultrasonic sealing method is capable of sealing through the spinach contamination of the sealing area without being perforated by the steam formed in the seal by the ultrasonic energy.

Low melting temperature polymers are polymers which have melting (Tm), glass transition (Tg) or softening temperatures below approximately 135° C. Typical low melting temperature polymer layers include single polymers or polymer blends of two or more components. The low melting polymer components include, but are not limited to: low density polyethylene, linear low density polyethylene, very low density polyethylene, ultralow density polyethylene, metallocene polyethylene, ethylene based plastomers, high density polyethylene, poly-1-butene, copolymers of ethylene-butene, copolymers of ethylene-propylene, terpolymers of ethylene-propylene-butene, Ionomers, polystyrene, amorphous polyesters, polyurethanes.

The high melting temperature polymer components are polymers which have melting (Tm), glass transition (Tg) or softening temperatures above approximately 150° C. Typical high melting temperature polymer layers include single polymers or polymer blends of two or more components. The high melting polymer components include, but are not limited to: Nylon 6, Nylon 66, amorphous Nylon, Nylon MDX6, polyethylene terephthalate, polyethylene naphthalate, ethylene-vinyl alcohol copolymers [EVOH], poly-4-methyl pentene, polypropylene, cyclic olefinic copolymers [COC], polycarbonate, The "tie" or adhesive layers used to bond the high melting polymers to the low melting polymers are copolymers or modified polymers used in tie layer technology. Specific polymer classes are commercially available for combining specific polymer pairs. Typically, tie or adhesive polymers are comprised of polar copolymers, which include, but are not limited to: polyethylene vinyl acetate (EVA), polyethylene methacrylic acid (EMA), polyethylene methyl methacrylic acid (EMMA), polyethylene acrylic acid (EAA), copolymers or anhydride graphed polymers which include, but are not limited to maleic anhydride graphed polyolefins.

The coextruded films of the invention can be produced using cast coextrusion or blown film coextrusion technologies. The films may also be oriented in the machine direction (MD), the transverse direction (TD) or biaxially using a tenter method or a double or triple bubble technology.

Figures 5, 6:
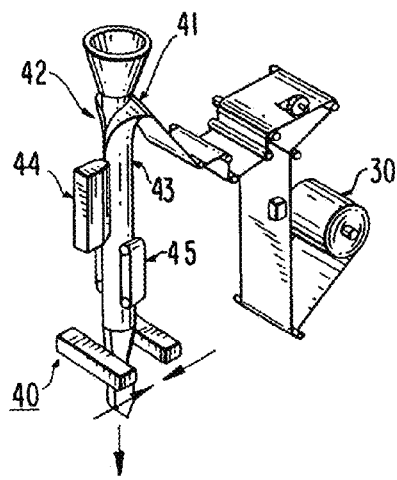
FIG. 5: Coextruded nine layer film for ultrasonic sealing of high solids vegetable slurries.
FIG. 6: A drawing of a VFF&S machine which may be used in forming the film pouches in accordance with the invention.

Alternative film constructions are shown in FIGS. 4 and 5.

The films of the can be constructed such that there are single or multiple high melting layers in the film construction. The high melting film layers may be located only on one film surface, only within the body of the film or a combination of on one film surface and within the body of the film structure.

Bags and pouches produced from the film may be formed from flat film sheets or roll stock on automatic forming, filling and sealing machines (VFF&S) which form a tube using a fin or lap seal along the back section of the tube and then form bottom and top seals in sequence with the operation of the packaging machine. A representative diagram of an VFF&S machine is shown in FIG. 6.

Standard heat sealing mechanisms can function with the films of invention. However, heat sealing has not proven successful in forming leak tight seals when the sealing surface is contaminated with slurries comprised of water and vegetable matter. Ultrasonic sealing has successfully sealed through the slurries of water and vegetable matter forming leak tight seals using the films of the invention.

Proper pressure and energy are needed when using ultrasonic sealing. The pressure should be about 50 psi and the energy should optimally be about 325 joules to save wear and tear on the sealing jaws.

Comparative Testing:

A series of plain PE based films were tested for ultrasonic sealing properties on a Bosch packaging sealer. During trials, the Bosch equipment used a 30 kHz ultrasonic sealer.

Samples of different PE based structures were tested along with a CPP laminate structure shown in FIG. 7. The films were tested to determine the impact of melt index, material thickness, homogeneity, colorant, olefin type, and moisture. Each film sample was subjected to seal conditions to determine the seal window, seal strength, and observable deformation or damage.

None of the films were able to ultrasonically seal in the presence of water except the PET/CPP lamination.

Both white and clear films failed with fin seals. The size and severity of pinholes and fractures were comparable. However, the clear structure appeared to have a wider seal window when formed with a lap seal. When water was introduced into the seal area, both films failed severely.

Thicker materials are more dimensionally stable. There was less shrinkage and deformation at higher gauges. Additionally, thicker films had a wider seal window. When water was introduced into the seal area, higher gauge films still failed severely.

The LMI variable was harder to seal and had the poorest operating window. Resins with HMI sealed easily, but more readily pinholed and fractured at higher energy inputs.

There was no observable data to determine the impact of homogeneity. Of the two homogenous variables, 4063-0-0.00 performed very well in dry conditions, while the 2043-0-0.00 did not seal. The distinction between the two films was the resin type. 4063-0-0.00 had a higher MI and lower density than 2043-0-0.00. This difference was found to have a greater impact than the homogeneity. Moreover, the other non-homogeneous variables outperformed the 2043-0-0.00.

Films were dipped into room temperature water and then sealed. The addition of moisture caused the films to deform severely. In some cases, the films actually severed during sealing. The films that contain the lowest melt temp and HMI resins at thin gauges performed the worst. Variable 2043, which is a LD/HD 3-layer blend, showed the least amount of pinholing and fracture, but is very expensive. The laminate structure appeared to withstand the impact of the water (referred to as Flexi 7181), but required a fin seal on the back seal to get good sealant-to-sealant contact, and good seals were not consistent.

A 13 layer film containing multiple nylon (and EVOH) layers (FIG. 3) was used in the form of flat, plain film 20 inches wide. A Propac machine was fitted with a heat sealer. A spinach slurry (78% spinach solids) was loaded into the machine and the packaging process operated at up to 15 packages per minute. Seals formed with the heat sealer were not functional showing leaks, poor seal formation and seal failure on handling.

The heat sealer was replaced with a Model KHS 20-IP65-L ultrasonic sealer and the machine restarted. The ultrasonic sealer formed fully functional seals at up to 45 packages per minute. Ultrasonic seals sealed through the spinach solids without voids and weak seal formation. The packages formed were fully functional.

What is claimed is:

1. A packaging film comprising at least four layers of coextruded film, wherein
    a) at least two of the at least four layers are high temperature resistant layers each comprising a high melting temperature polymer or a blend of two or more high melting temperature polymers,
    b) at least one of the at least four layers is a low melting temperature sealing layer comprising a low melting temperature polymer or a blend of two or more low melting temperature polymers, and
    c) at least one of the at least four layers is an adhesive layer between, and immediately adjacent to, a high temperature resistant layer and a low melting temperature sealing layer, said adhesive layer comprising a material selected for suitability for bonding the high melting polymer to the low melting polymer,
    which packaging film is suitable for forming an ultrasonic seal.

2. The package film of claim 1, wherein the high melting temperature polymer is selected from the group consisting of Nylon 6, Nylon 66, Nylon 6/Nylon 66 blend, Nylon MDX6, amorphous nylon, polyester, cyclic olefinic copolymer (COC), polyethylene terephthalate, polyethylene naphthalate, copolymer of ethylene and vinyl alcohol (EVOH), poly-4-methyl pentene, polycarbonate, polypropylene and a blend of two or more thereof.

3. The packaging film of claim 1, wherein the low melting temperature sealing layer is a surface layer and the high temperature resistant layer is an interior layer.

4. The packaging film of claim 1, further comprising a layer consisting essentially of polyethylene.

5. The packaging film of claim 1, comprising two surface layers which are low melting temperature sealing layers.

6. The packaging film of claim 1, wherein each of the high temperature resistant layers consist essentially of a high melting temperature polymer or a blend of two or more high melting temperature polymers, and each of the low melting temperature sealing layers consist essentially of a low melting temperature polymer or a blend of two or more low melting temperature polymers.

7. The packaging film of claim 1, wherein the high melting temperature polymer has a melting temperature (Tm), glass transition temperature (Tg) or softening temperature of above about 145° C.

8. The packaging film of claim 7, wherein the high melting temperature polymer has a Tm, Tg or softening temperature of above about 150° C.

9. The packaging film of claim 1, wherein the low melting temperature polymer has a Tm, Tg or softening temperature of below about 135° C.

10. The packaging film of claim 9, wherein the low melting temperature polymer is selected from the group consisting of low density polyethylene, linear low density polyethylene, very low density polyethylene, ultralow density polyethylene, metallocene polyethylene, ethylene alpha olefin copolymer, high density polyethylene, poly-1-butene, copolymer of ethylene-butene, copolymer of ethylene-propylene, terpolymer of ethylene-propylene-butene, Ionomer, polystyrene, amorphous polyester, polyurethane and a blend of two or more thereof.

11. The packaging film of claim 1, wherein the material of the adhesive layer is a copolymer, a modified polymer, a polar copolymer, or a blend of two or more thereof.

12. The packaging film of claim 11, wherein the polar copolymer is selected from the group consisting of polyethylene vinyl acetate (EVA), polyethylene methacrylic acid (EMA), polyethylene methyl methacrylic acid (EMMA), polyethylene acrylic acid (EAA), copolymer or anhydride graphed polymer, and a blend of two or more thereof.

13. The packaging film of claim 12, wherein the polar copolymer is maleic anhydride graphed polyolefin.

14. The packaging film of claim 1, comprising at least 7 layers.

15. The packaging film of claim 14, comprising at least 13 layers.

16. A sealed package formed of a packaging film which comprises a plurality of layers of coextruded film, wherein
    a) at least one of the plurality of layers is a high temperature resistant layer comprising a high melting temperature polymer or a blend of two or more high melting temperature polymers,
    b) at least one of the plurality of layers is a low melting temperature sealing layer comprising a low melting temperature polymer or a blend of two or more low melting temperature polymers, and
    c) at least one of the plurality of layers is an adhesive layer between, and immediately adjacent to, a high temperature resistant layer and a low melting temperature sealing layer, said adhesive layer comprising a material selected for suitability for bonding the high melting polymer to the low melting polymer,
    wherein the high temperature resistant layer and the low melting temperature sealing layer are sealed together by an ultrasonic seal.

17. The sealed package of claim 16, wherein the low melting temperature sealing layer is a surface layer and the high temperature resistant layer is an interior layer.

18. A method for packaging high solid vegetable slurry comprising
    a) filling a bag formed from the packaging film of claim 1 with the high solid vegetable slurry, and
    b) subjecting the packaging film to ultrasonic sealing to seal the bag.

19. The method of claim 18 wherein in step b) the ultrasonic seal is formed at about 50 psi pressure and about 325 joules energy.

20. The method of claim 18 wherein step a) is performed using Vertical Form and Fill apparatus.

* * * * *